Nov. 25, 1947.　　　　O. V. PAYNE　　　　2,431,340
PHOTOELECTRIC WEFT DETECTOR FOR LOOMS
Filed June 30, 1945　　　2 Sheets-Sheet 1
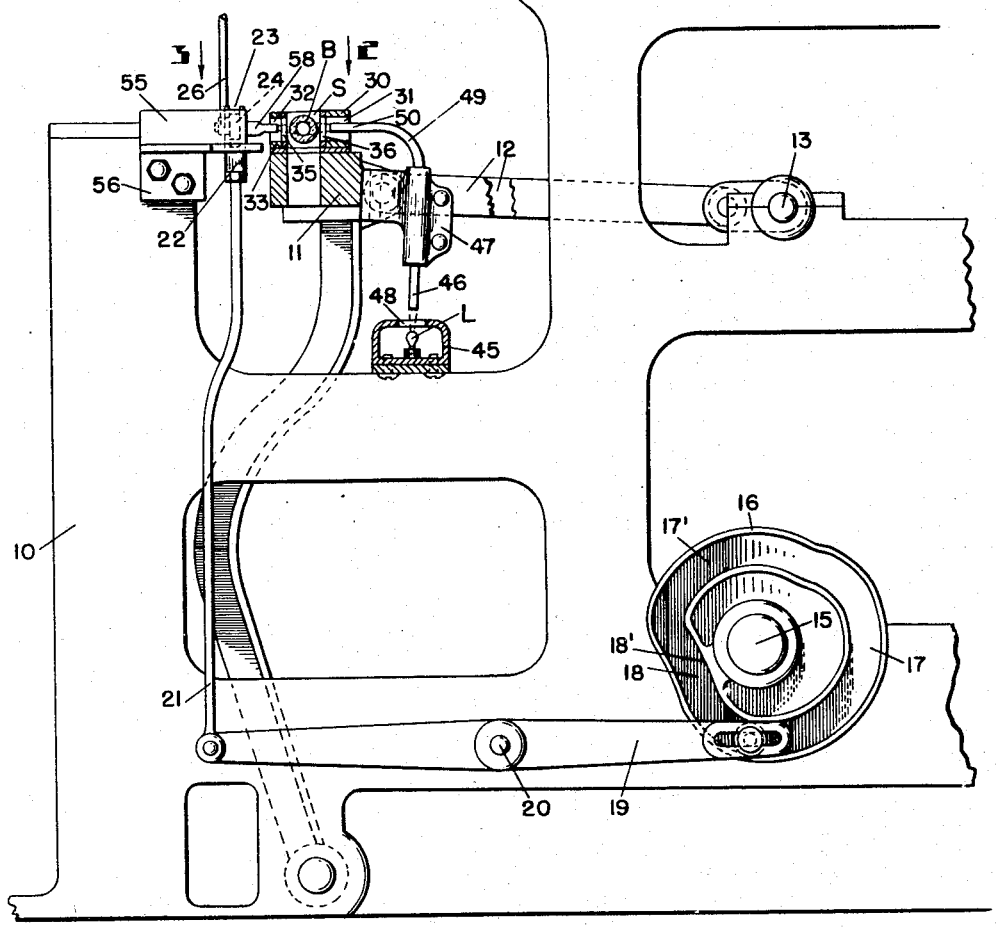
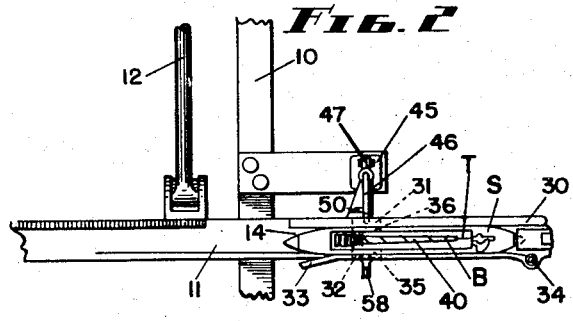
INVENTOR
OSCAR V. PAYNE
Chas. T. Hawley
ATTORNEY Nov. 25, 1947.   O. V. PAYNE   2,431,340
PHOTOELECTRIC WEFT DETECTOR FOR LOOMS
Filed June 30, 1945   2 Sheets-Sheet 2
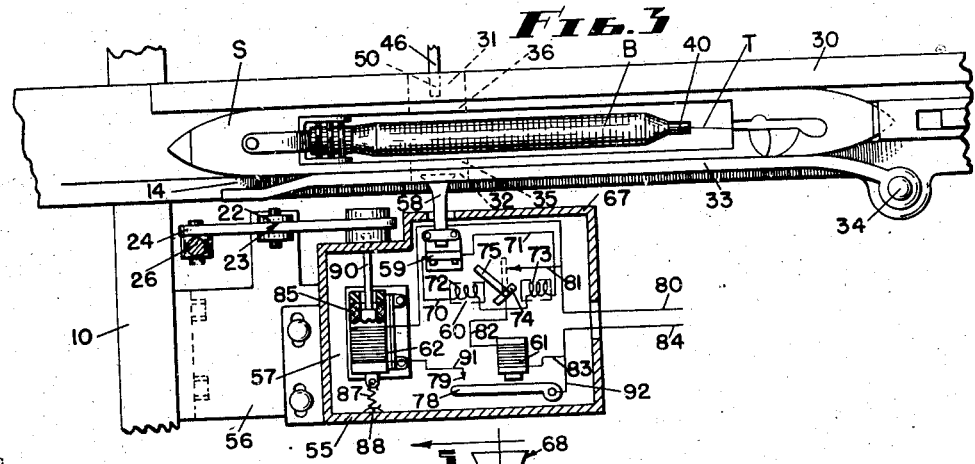
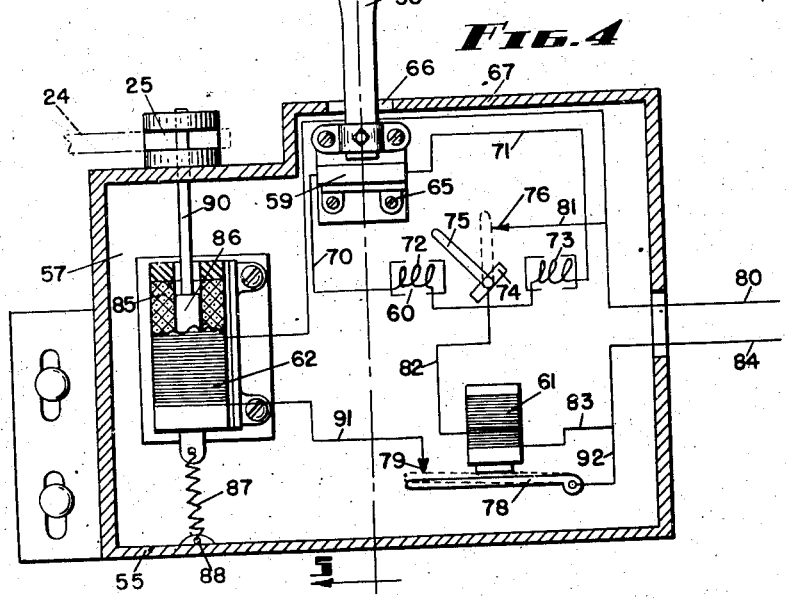
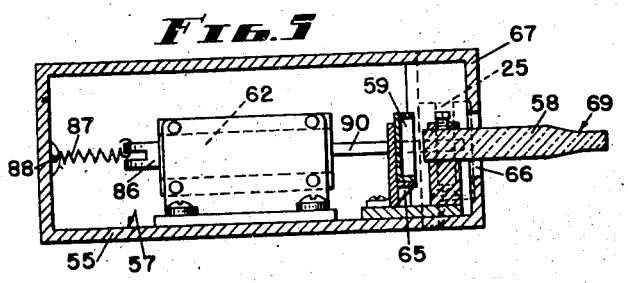
INVENTOR
OSCAR V. PAYNE
Chas. P. Hawley
ATTORNEY Patented Nov. 25, 1947

2,431,340

UNITED STATES PATENT OFFICE 2,431,340

PHOTOELECTRIC WEFT DETECTOR FOR LOOMS

Oscar V. Payne, Leicester, Mass., assignor to Crompton & Knowles Loom Works, Worcester, Mass., a corporation of Massachusetts Application June 30, 1945, Serial No. 602,436

6 Claims. (Cl. 139—273)

1

This invention relates to weft detecting mechanisms for looms and it is the general object of the invention to provide a detecting system to cooperate with a transparent bobbin.

In the weaving of very fine weft difficulty is frequently encountered when the usual type of weft detector is employed due to abrasion of the yarn. In order to avoid any physical contact between the weft and the detecting mechanism it has been proposed heretofore to employ a photoelectric cell which will be energized by a light beam at the time of weft exhaustion. Previous detecting systems of this latter type, however, have employed opaque bobbins necessitating either some form of reflecting surface on the bobbin, or perforations which weaken the bobbin. My present invention contemplates the use of a bobbin having a transparent barrel used in conjunction more particularly with improved means for delivering a beam of light to the bobbin. This means may include a transparent rod or a tube made of such material as to convey light from a source to the bobbin.

In the use of photoelectric weft detectors some provision must be made to prevent indication of weft exhaustion by light shining through a shuttle box prior to entry of the shuttle into the box. The loom lay ordinarily reciprocates in a more or less horizontal direction and it is another object of my invention to provide the aforesaid light transmitting element with a light receiving end or part which is moved toward and away from a source of light by motion of the lay. In this arrangement the lamp can burn continuously but will be ineffective except during the brief detecting interval in the loom cycle when the lay by its forward movement moves the light transmitting element into register with the lamp. At all other times during the loom cycle the light transmitting element will be out of register with the lamp and the latter will therefore be ineffective to operate the photoelectric cell.

It is another object of my present invention to provide a source of light and a photoelectric cell which are optically connected by a light transmitting system which enters both sides of the shuttle box and includes the aforesaid transparent bobbin. An optical system so constructed loses very little light and as a result a small lamp can be employed with the detector system.

In the normal operation of a loom the shuttle passes from one side to the other of the loom and is at the detecting end on one beat when the lay is at front center but is at the opposite end on the next beat when the lay reaches front center.

2

Under these conditions a photoelectric detecting system might give an improper indication of weft exhaustion when the shuttle is at the end of the loom opposite the detecting system. It is another object of my present invention to avoid this improper indication by the use of mechanism such as a cam controlled actuator which will have an operating stroke when the shuttle is on the detecting side of the loom but will be idle when the shuttle is at the opposite end of the loom so that even though indication of exhaustion should be given under the latter condition such indication will not be communicated to the weft replenishing mechanism.

A well-known form of weft replenishing loom employs a floating lever having one end thereof operatively connected to the weft replenishing mechanism and having the other end thereof under control of a pin or stop the position of which is determined by the detector mechanism. When the stop is out of the path of the floating lever the latter has a descending movement on detecting beats of the loom without affecting the replenishing mechanism, but when the stop is moved into operative position to interrupt downward movement of the floating lever the latter acts to set the replenishing mechanism for operation. It is a further object of my present invention to control the stop or pin by a solenoid which is in a circuit controlled by the photoelectric cell. In this connection it is convenient to locate the photoelectric cell, the solenoid and a relay which controls it, and the controller pin or stop all in a single housing from which the pin projects for cooperation with the floating lever. The housing may conveniently be mounted on a stand or the like secured to the loom frame so that the operating parts of the detector system can be held permanently in relatively fixed position.

With these and other objects in view which will appear as the description proceeds, my invention resides in the combination and arrangement of parts hereinafter described and set forth.

In the accompanying drawings, wherein a convenient embodiment of my invention is set forth, Fig. 1 shows part of a loom in side elevation and having my invention applied thereto, the lay, shuttle box and shuttle, and also the housing for the lamp, being in section, Fig. 2 is a detailed plan view looking in the direction of arrow 2, Fig. 1, Fig. 3 is an enlarged view looking in the direction of arrow 3, Fig. 1, the casing or housing which contains certain parts of the detecting system being in section, Fig. 4 is an enlarged view similar to a portion of Fig. 3 and showing the contents of the housing, and Fig. 5 is a vertical section on line 5—5 of Fig. 4.

Referring particularly to Fig. 1, I have shown a loom frame 10 having a lay 11 attached to connectors 12 driven by the top shaft 13 of the loom. The lay is provided with a shuttle box 14, see Fig. 3, in which a shuttle S will be located on detecting beats of the loom. The bottom shaft 15 of the loom has secured thereto a cam 16 approximately one-half of which is formed with a dwell 17 and the other half of which has a non-concentric operating portion 18. The cam cooperates with a lever 19 pivoted as at 20 to the loom frame and having the forward end thereof attached to an upright rod 21. A block or head 22 secured to the upper end of rod 21 is forked as at 23 to receive a floating actuating lever 24. The right end of this lever as viewed in Fig. 3 extends into a slot 25, see Fig. 4, formed in a stationary part of the loom, while the left end of the lever is connected to an upwardly extending rod 26 attached to the weft replenishing mechanism not shown.

During normal loom operation the lay reciprocates backwardly and forwardly due to turning of the top shaft 13 and the cam 16 makes a rotation every second pick of the loom. During the time that the shuttle is at the non-detecting end of the loom the dwell 17 of cam 16 holds lever 19 and therefore the actuating lever 24 stationary, but when the shuttle S is at the detecting end of the loom the non-concentric portion 18 of the cam operates in such manner as to cause reciprocation of the head 22, cam depression 18' causing the floating lever to move downwardly when the lay is in its front center position, and cam point 17' immediately thereafter causing the lever to rise. The operation of cam 16, lever 24 and rod 26 is well understood and of itself forms no part of my present invention, being similar to corresponding devices used in the ordinary multicolor weft replenishing loom. It is thought sufficient to state that when the right end of lever 24 as viewed in Fig. 3 is uninterrupted in its downward movement no change results in the operation of the loom so far as replenishment is concerned, but when such downward movement is interrupted replenishment is initiated and operation of the replenishing mechanism not shown ensues. Furthermore, lever 24 is at rest when the shuttle is at the opposite end of the loom due to the fact that dwell 17 holds lever 19 stationary.

The matter thus far described except for features of the shuttle box 14 and shuttle S to be described hereinafter may be of common construction.

In carrying my present invention into effect I provide the shuttle box with a back wall 30 having a slot or opening 31 therein which registers with a second slot 32 formed in the shuttle binder 33 pivoted as at 34 to the lay, see Figs. 1, 2 and 3. The shuttle has front and back slots 35 and 36, respectively, which register with the slots 31 and 32, respectively, when the shuttle S is properly boxed, as indicated in Fig. 3. Under such conditions a beam of light can pass through the shuttle box provided no interruption to the light exists in the shuttle.

The bobbin B in the shuttle may be of usual form except that it has a transparent barrel 40, see Fig. 2, which may be tubular as indicated in Fig. 1, or it may be solid. In either event the barrel transmits light and acts in the capacity of a lens. The weft thread T when present in sufficient amount for continued weaving covers the transparent part of the bobbin which is in register with the slots 31, 32, 35 and 36, thereby preventing passage of light through the shuttle box, but when the weft supply is depleted a beam of light can pass through the shuttle box and bobbin.

In order that a beam of light may be delivered to the shuttle box I employ a source of light such as an electric lamp L mounted in a housing 45 secured to the loom frame, see Fig. 1, and secure a light transmitting rod or tube 46 to the lay. This tube or rod, which may be a methyl methacrylate plastic and known commercially as "Lucite," is held by a support 47 extending rearwardly from the lay and has its lower end polished and in such position that when the lay is on front center position light from the lamp L will pass upwardly through an aperture 48 in the casing 45 and enter the lower end of the light transmitter 46. The upper end of the rod or tube 46 is bent as at 49 and has a substantially horizontal forwardly extending end 50 which preferably projects into the opening 31 in the box back 30. The forward upper end of the transmitter rod 46 is preferably polished and is out of the path of but close to the shuttle S as the latter moves into and out of the shuttle box 14.

That part of my improved detecting system which responds to passage of light through the shuttle box is shown more particularly in Figs. 3, 4 and 5 and is contained in a housing 55 mounted on a bracket 56 secured to the loom frame 10. This housing has a floor 57 on which is mounted a light receiving tube 58, a photoelectric cell 59, a galvanometer 60, relay 61, and solenoid 62. The tube 58 is made of light transmitting material similar to that of which the rod or tube 46 is constructed and is held by a small stand 65 mounted on the floor 57. An opening 66 in the rear wall 67 of the housing has passing therethrough the light receiver 58. The latter may be fan shaped as shown at 68 in Fig. 4, and flattened as indicated at 69 in Fig. 5 so that it may enter slot 32 in the shuttle binder 33.

The photoelectric cell 59 has the exposed part thereof facing the forward polished end of the light receiver 58. This cell is connected by means of wires 70 and 71 to galvanometer coils 72 and 73, respectively, between which swings an armature 74. The latter has a contact arm 75 which is normally in the full line position shown in Fig. 4 away from a stationary contact 76.

The relay 61 has an armature 78 normally in down position away from stationary contact 79, see full lines, Fig. 4. When the photoelectric cell 59 is excited to energize the galvanometer, arm 75 will swing to the dotted line position shown in Fig. 4, whereupon current will flow from wire 80 connected to a source of electric power, wire 81, contact 76, arm 75, wire 82, relay 61, and wire 83 to wire 84 which is connected to the opposite side of the source of electric power. The relay armature 78 is thereupon moved to the dotted line position of Fig. 4 into engagement with contact 79.

The solenoid 62 has a coil 85 in which is mounted a core 86 normally held in forward position by a light spring 87 the forward end of which is connected as at 88 to the housing 55. Extending rearwardly from the core is a controller pin or stop 90 which is adapted for movement across slot 25 but which is normally held in front of the slot and out of interrupting position relatively to lever 24 by the spring 87. When the relay 61 is energized as already described, however, power will flow as follows: wire 80, coil 85, wire 91, contact 79, relay armature 78, and wire 92 to wire 84. Under these conditions the coil 85 is energized and sucks the core rearwardly against the action of spring 87, thereby moving the rod or stop pin 90 across slot 25 and under the right end of lever 24 as viewed in Fig. 3.

When the lay is on front center and the shuttle is at the non-detecting side of the loom the shuttle box 14 will be empty and light issuing from the transmitter 46 will be directed toward the light receiver 58. Under these conditions, however, there is enough spreading of the light from the transmitter 46 so that such light as does fall on the receiver 58 is not sufficiently intense to cause the photoelectric cell and galvanometer to effect full movement of the contact arm 75. If by any circumstance the light from the lamp L is sufficiently intense to cause complete movement of the contact arm 75 at this time, weft replenishment will not be initiated even though the controller pin 90 moves across slot 25 due to the fact that lever 19 at this time is held stationary by the dwell 17 of cam 16. Should the pin be actuated by the solenoid when the shuttle is on the non-detecting side of the loom, it will be released and moved forwardly by the spring 87 during the first part of the rearward movement of the lay as soon as the lower end of the light transmitter tube 46 is out of register with the lamp L.

The more desirable and intended mode of operation is to rely upon insufficient illumination of the light receiver 58 when the shuttle is on the non-detecting side of the loom and rely upon the lens action of the transparent bobbin barrel 40 to concentrate the light from the transmitter 46 upon the rear end of the light receiver 58 when the depleted shuttle is in box 14. By reason of the conditions just described it will be understood that under no circumstance can the detector cause an operative movement to be given to the rod 26 on those forward beats of the lay when the shuttle is on the non-detecting side of the loom.

From the foregoing it will be seen that I have provided a photoelectrically operated weft detecting system wherein the back and forth movement of the lay causes registry of the stationary lamp L with the lay carried light transmitter 46 as the lay approaches its front center position, and it will be seen because of these conditions that excitation of the photoelectric cell occurs only during this relatively brief period of registry. Also, the light transmitter 46 and the light receiver 58 are both made of light transmitting material, such as the "Lucite" previously mentioned, and that because of these parts the optical system between the lamp and the photoelectric cell is substantially closed except for short gaps. The front end of the light transmitter 46 and the rear end of the light receiver 58 are proportioned so they enter parts of the shuttle box 14. The use of the two-pick cam having the dwell 17 prevents false or improper setting of the weft replenishing mechanism by the rod 26 when the shuttle is on the non-detecting side of the loom. In this connection the invention contemplates control of the pin 90 for cooperation with the lever 24 by means of a circuit including a photoelectric cell. Also, the housing 55 protects the several electrical parts of the system from lint and holds them in fixed position. The light transmitter 46 and the light receiver 58 do not interfere with movement of the shuttle in the box nor are they in position to interfere with the incoming and outgoing bobbins incident to a replenishing operation. The lamp L and the cell 59 are both stationary and are connected optically by the moving light transmitter 46.

Having thus described my invention it will be seen that changes and modifications may be made therein by those skilled in the art without departing from the spirit and scope of the invention and I do not wish to be limited to the details herein disclosed, but what I claim is:

1. In a photoelectric weft detecting system for a loom having a reciprocating lay carrying a transparent bobbin which when depleted of weft will transmit light, a photoelectric cell which when energized by an effective change in the illumination thereof causes said system to initiate a change in loom operation, means directing a beam of light along a path transverse of the motion of the lay, and a light transmitter on the lay having one end adjacent to the bobbin and having the other end thereof moved by the lay into said path of light to transmit light from said means through said bobbin to said photoelectric cell, provided the bobbin is depleted, and cause an effective change in the illumination of said photoelectric cell.

2. In a photoelectric weft detecting system for a loom having a lay provided with a shuttle box containing a transparent bobbin which transmits light when depleted of weft, a photoelectric cell in front of the shuttle box effective upon a change of illumination thereof to cause said system to initiate a change in loom operation, a source of light, a light receiver extending from said photoelectric cell into said shuttle box to a point in front of said bobbin, and a light transmitter on the lay behind the shuttle and extending into said shuttle box, the lay moving said light transmitter into the light issuing from said source and toward said light receiver, whereby light is transmitted from said source through said transmitter and transparent bobbin to said light receiver and photoelectric cell to cause a change in the illumination of the latter, provided the weft on the bobbin is depleted.

3. In a photoelectric weft detecting system for a loom having a lay provided with a bobbin to be detected which is transparent when depleted of weft, a photoelectric cell member mounted in fixed position and effective upon a change in the illumination thereof to cause said system to initiate a change in loom operation, a fixed source member from which a beam of light extends, the lay moving one side of said bobbin toward one of said members, and a light transmitter on the other side of said bobbin and moved by the lay into position to optically connect said members, provided the bobbin is depleted of weft, to effect a change in the illumination of said photoelectric cell member.

4. In a photoelectric weft detecting system for a loom having a lay provided with a bobbin to be detected which is transparent when depleted of weft, a photoelectric cell member effective upon a change in the illumination thereof to cause said system to initiate a change in loom operation, a source member from which a beam of light is projected, both of said members being in fixed position and one of said members being adjacent to said shuttle box and visible from said bobbin when the latter is being detected, and a solid light transmitter moved by the lay to connect said members optically and transmit light from said source member to said bobbin, the light passing through the bobbin, provided the latter is depleted of weft, and falling on the photoelectric cell member to effect a change in illumination thereof.

5. In a photoelectric weft detecting system for a loom having a lay which on alternate forward and detecting beats thereof moves to detecting position a bobbin which is transparent when depleted of weft, an actuator having regularly recurring movements on said alternate beats and being idle on the intervening beats, a controller tending normally to be out of the path of the actuator but when in said path on any of said alternate beats interrupting normal movement of the actuator to initiate a change in loom operation, a photoelectric cell which when subjected to a change of illumination causes said system to move the controller into the path of said actuator, and means tending to direct a beam of light on to said photoelectric cell on each forward beat of the lay, the light passing through the bobbin when the latter is depleted on a detecting beat to cause a change in the illumination of said photoelectric cell and cause said controller to interrupt movement of said actuator, and a change in illumination of the photoelectric cell occurring on the intervening forward beats causing the controller to move into said path of the actuator but without cooperation with the latter due to the fact that the actuator is idle.

6. In a photoelectric weft detecting system for a loom having a reciprocating lay provided with a shuttle box which on alternate forward beats of the lay is occupied by a shuttle having a bobbin to be detected, the bobbin transmitting light when depleted of weft, an actuator having a movement on each of said alternate forward beats and being idle on the intervening forward beats, a controller for the actuator movable into and out of the path of the actuator and when in said path on any of said alternate beats interrupting movement of the actuator and cooperating with the latter to initiate a change in loom operation, a photoelectric cell effective when the illumination thereof is changed to cause said system to move the controller into the path of said actuator, and means operative on each forward beat of the lay to direct a beam of light across the shuttle box on to said photoelectric cell, said bobbin when depleted and in the shuttle box on a forward beat of the lay transmitting said beam of light which falls on the photoelectric cell to change the illumination thereof with resultant movement of the controller into the path of the actuator, and means tending to move the controller out of the path of the actuator, movement of the controller into the path of the actuator on the intervening forward beats of the loom due to light passing through said box and falling on to said photoelectric cell and subsequent movement of the controller out of said path by the last named means occurring without cooperation between the controller and actuator due to the fact that the latter is idle.

OSCAR V. PAYNE.

REFERENCES CITED

The following references are of record in the file of this patent:

UNITED STATES PATENTS

| Number | Name | Date |
|---|---|---|
| 2,256,595 | Metcalf | Sept. 23, 1941 |
| 2,026,147 | Turner | Dec. 31, 1935 |
| 2,026,146 | Turner | Dec. 31, 1935 |
| 2,026,149 | Turner | Dec. 31, 1935 |
| 2,026,148 | Turner | Dec. 31, 1935 |
| 1,523,149 | Wheeler | Jan. 13, 1925 |
| 1,882,962 | Sawford | Oct. 18, 1932 |

FOREIGN PATENTS

| Number | Country | Date |
|---|---|---|
| 600,330 | Germany | June 7, 1933 |
| 405,757 | Great Britain | Feb. 15, 1934 |